No. 714,327. Patented Nov. 25, 1902.
R. W. PITTMAN.
UNIVERSAL JOINT.
(Application filed Aug. 2, 1901.)
(No Model.) 2 Sheets—Sheet 1.
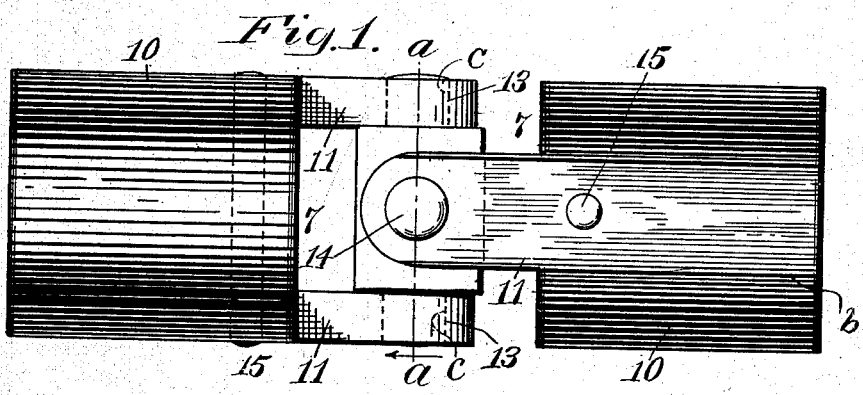
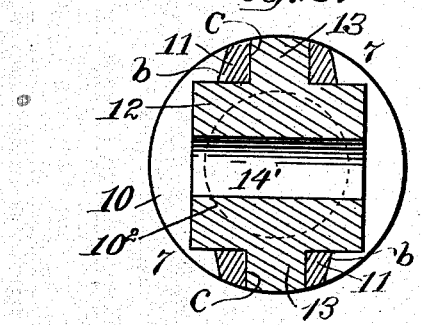
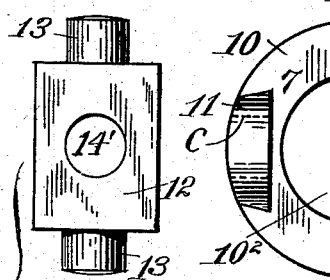
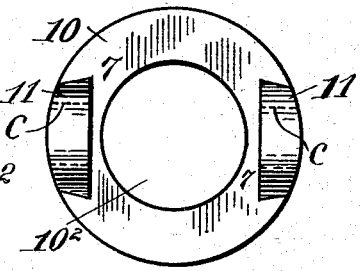
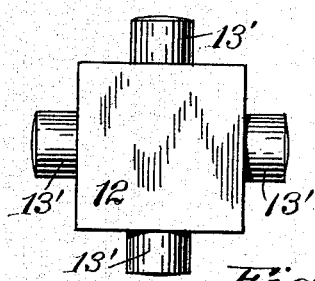
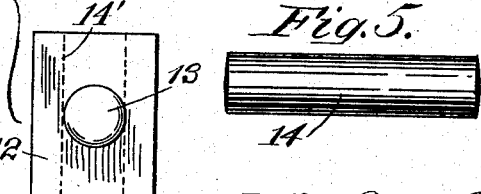
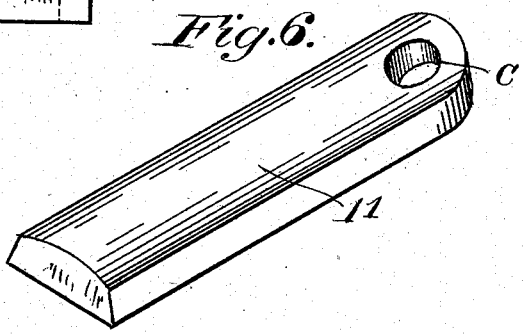
Witnesses
A. G. Raw.
Edward A. Jarvis
Inventor.
Reinhart W. Pittman,
by his Attorney,
Pierson L. Wells.

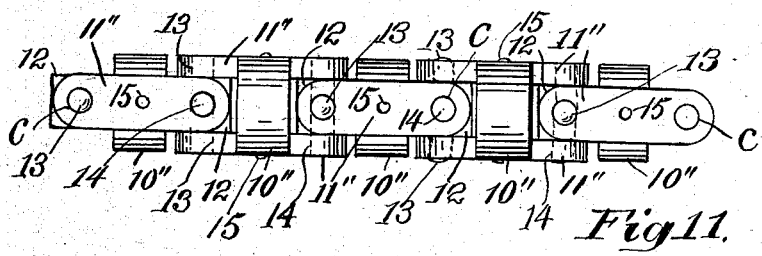
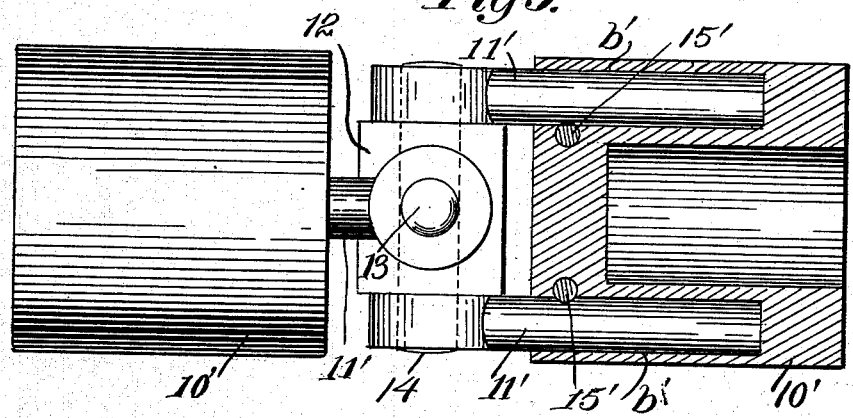
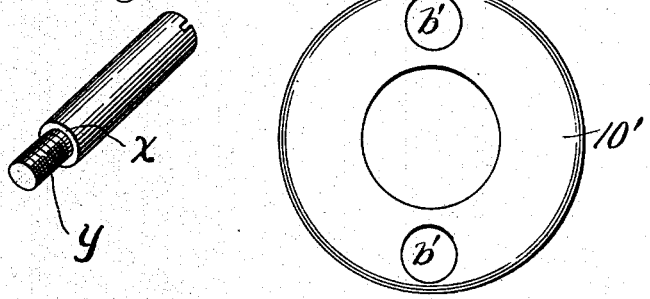

UNITED STATES PATENT OFFICE.

REINHART W. PITTMAN, OF NEW YORK, N. Y.

UNIVERSAL JOINT.

SPECIFICATION forming part of Letters Patent No. 714,327, dated November 25, 1902.

Application filed August 2, 1901. Serial No. 70,592. (No model.)

*To all whom it may concern:*

Be it known that I, REINHART W. PITTMAN, of the borough of Manhattan, city and State of New York, have invented a certain new and useful Improvement in Universal Joints, of which the following is a specification.

This invention relates to the manufacture of devices, commonly known as "universal joints," for transmitting power from a driving shaft or member to a second shaft or member—such, for instance, as a driven shaft—disposed at an angle to the driving element; and the present invention further embraces an organization in which there is included a plurality of such devices or joints constituting a so-called "flexible shaft."

The present improvement has for an object the provision of a device, individual and compound, of this character having but few parts, which are simple in nature, involve but few operations in their manufacture, and are capable of being readily assembled to form an integral structure susceptible of transmitting a maximum of power, and yet whose manufacture may be carried out at a minimum of time and labor.

The present joint as ordinarily made comprises proper parts or fittings, one for each of the two contiguous ends of the two members between which motion is to be transmitted, and as such a joint is usually employed to couple angularly-disposed shafts these members will hereinafter be referred to as "shafts," although it will be understood that in using this term it is definitive only of a special form of driving and driven members which may be operatively connected. These fittings in the preferred construction are identical with each other in all respects and are operatively united one with the other by a construction including pivotal connections defining axes disposed transversely to each other, which connections are supported in separate arm-like pieces attached to the said fittings, all of which will appear from the following specication with the aid of the accompanying drawings.

In the drawings, Figure 1 is a side elevation of a universal joint embodying my present invention. Fig. 2 is a cross-section on the plane of the line $a\ a$ in Fig. 1 with a certain pivot-pin removed. Fig. 3 is an end view of one of the fittings or parts for connecting the joint to one of the members or shafts, showing the arm-like supports for the pivotal connections in position. Fig. 4 shows different elevational views of a block from which extend studs embodied in the pivotal connection, one of the pivotal members, consisting of a through-pin, having been removed. Fig. 5 is a side view of this through-pin. Fig. 5$^a$ is a similar view of a modified through-pin. Fig. 6 is a perspective view of an arm-like pivotal support removed from its guideway in the fitting. Fig. 7 is a transverse cross-section through one of the fittings, showing the guideways therein for the pivotal arm-like supports. Fig. 8 is an elevation of a block, showing a modification, the view being at right angles to Fig. 4, with the through-pin replaced by integral studs. Fig. 9 is a side elevation, partly in section, of a modified construction. Fig. 10 is an end view of Fig. 9. Fig. 11 is an elevational view of a number of individual joints connected end to end and forming a flexible shaft.

Similar characters of reference designate corresponding parts in all the figures.

For the purpose of attaching the present joint to the shafts or members between which motion is to be transmitted I ordinarily provide suitable means for fixedly securing the various elements in correct relation, consisting in the form of the device set forth in Figs. 1 to 8, inclusive, of a part or fitting, (designated by 10,) one for each shaft. (Not shown.) These fittings may advantageously be identical in form and construction for convenience of manufacture, and they are so constructed as to adapt them to be properly secured to their respective shafts. In the particular instance shown in said figures each fitting is tubular in form, thus enabling the fitting if of proper proportions to fit over its shaft. In the modification set forth in Figs. 9 and 10 the central opening in the fitting 10' does not extend entirely therethrough, although it may do so.

Projecting from the adjacent ends of each fitting 10 and terminating some distance from the end face thereof is a pair of arms or arm-like supports 11, which are disposed on diametrically opposite sides of the fitting and for convenience in assembling and economy of manufacture are made separate from the fitting and appropriately secured thereto. For the purpose of securing the arm-like supports in place I prefer to form guideways, (designated by $b$ $b$ in the embodiment set forth in the figures on the first sheet of the drawings,) locating them in proper positions in or on each fitting and extending them lengthwise of the axis of the fitting. When guideways are thus formed for the attachment of the arms, these latter may be simple straight pieces having a cross-sectional form corresponding to that of the guideways, which may be rolled, forged, cut, or otherwise formed in the fitting. These arm-like supports may similarly be rolled, forged, or machined to a sliding fit in the guideways, although to cheapen the cost of manufacture I prefer to roll them to shape.

The guideways $b$ $b$ are preferably of such a cross-sectional outline as to retain the inserted arms from lateral displacement. Thus in the construction shown in Figs. 1 to 8 each guideway is undercut at its sides, enabling the arm whose sides are a counterpart of such undercut portions to be moved lengthwise, but preventing its lateral displacement.

Pivotal connections whose pivotal axes are disposed at substantially right angles to each other connect the two arm-like supports carried by one fitting with the similar supports carried by the opposed fitting. These connections conveniently comprise a block or carrier 12, located between each set of arms and supporting pivotal portions defining the said pivotal axis. These pivotal portions may be secured to the block in any desired manner. In the construction illustrated one pivotal axis is defined by studs 13 13, extending from the block and formed integral therewith, while the other axis is defined by a through-pin 14, extending through an opening 14' in the block, with its axis disposed at substantially right angles to the common axis of the studs 13 13. It will of course be understood, however, that this particular construction for pivotally attaching the parts together may be varied without departing from the spirit of the invention. Thus all the pivotal portions may be integral with the block, (see 13', Fig. 8.)

The several arms 11 are each provided with a proper journal-opening, such as C, for engaging with the corresponding pivotal portion, and in assembling the parts each pair of arm-like supports which engage with pivot-studs may be slipped over the studs and then inserted in place in their guides, the resulting structure having an appearance such as indicated in Fig. 1. By reason of the character of the guideways described the arm-like supports will be prevented from lateral displacement, although such supports are susceptible of longitudinal movement to and fro, which under some circumstances it may be desirable that they should have when the joint is in use, at least to a slight degree. If, however, it is deemed best to fixedly secure the supports in position, this may be done, as by a pin 15, passing through an opening in each support and serving the purpose of pinning the supports to the fitting.

Referring to the modification set forth in Figs. 9 and 10, in this construction the guideways $b'$ $b'$ for the reception of the pivotal arm-like supports 11' 11' each consist of a cylindrical opening properly located in the fittings 10' 10' and performing a function entirely analogous to that inherent in the form of guideway indicated in the first-described embodiment of the invention. A pin 15' may be used, as before, for securing each arm-like support in place, while the block 12, studs 13 13, and through-pin 14 may be similar to those previously described.

As a further feature of the invention a number of individual joints may be connected end to end to form a chain thereof and constitute a flexible shaft, as shown in Fig. 11. Such a shaft is built up of individual joints having a construction similar to that illustrated in the views on Sheet 1 of the present drawings, but somewhat modified. In the shaft organization the various parts each corresponding to the fitting 10 is designated by 10'', and each part is provided, like the fitting, with suitable guideways for the reception of the pivotal arm-like supports 11'' 11'' on opposite sides. In this organization, however, each end of each support extends beyond its part 10'', being provided with eyes or journal-bearings C on opposite sides of such part, through which the pivotal members pass. Each pivotal connection may comprise, as before, a block 12, from which extends studs 13 13, a transverse opening being formed in the block for the passage of a similar through-pin 14. In assembling the individual sections of the shaft a pair of arm-like supports is first engaged with the studs upon a block, and then the former are inserted in their guideways. These assembled parts may then be connected individually one with the other by means of the pins 14, which serve to pivotally attach the free ends of each pair of inserted arm-like supports 11'' 11'' with the pivot-block of the adjacent joint. If desired, each pair of arm-like supports may be fastened to its part 10'' by a pin 15, as already referred to. A shaft so built up of a plurality of joints may be utilized for various purposes in the arts to transmit motion from one point to another.

While I have shown and described members in the nature of fittings for the attachment of the joint to the shafts between which motion is to be transmitted, instead of employing them, however, I may form the guideways for the reception of the arm-like supports in either one or both of the connected shafts, and thus do away with such separate fittings or attachments altogether.

Any appropriate means may be utilized for securing the through-pin in place if the same be used. Thus the pin may be provided with a head or shoulder $x$ and have a thread $y$ on one end, (see Fig. 5ª,) which latter engages with a corresponding thread formed in the opening C in one of the arm-like supports. The studs 13 may also be separate pieces secured fixedly to the pivot-block instead of being made integral therewith.

Having described my invention, I claim—

1. In a universal joint, the combination with a pair of fittings each having a central opening adapting the fittings to be rigidly connected to the contiguous ends of the shafts between which motion is to be transmitted and each of which fittings is provided with a pair of sockets diametrically opposite each other, of arm-like supports engaged with said sockets and each having a journal-opening at its outer end; a pivot block or carrier; and pivot-pins extending from the block and entering the respective journal-openings, two at least of said pins being integral with said block.

2. In a universal joint, the combination with a pair of fittings each having a central opening adapting the fittings to be rigidly connected to the contiguous ends of the shafts between which motion is to be transmitted and each of which fittings is provided with a pair of sockets diametrically opposite each other, each socket having a relatively narrower width at points nearer the periphery of the corresponding fitting than at the center of the socket, of arm-like supports engaged with said sockets and each having a journal-opening at its outer end; a pivot block or carrier; and pivot-pins extending from the block and entering the respective journal-openings, two at least of said pins being integral with said block.

3. In a universal joint, the combination with a pair of fittings each having a central opening adapting the fittings to be rigidly connected to the contiguous ends of the shafts between which motion is to be transmitted and each of which fittings is provided with a pair of sockets diametrically opposite each other, each socket having a relatively narrower width at points nearer the periphery of the corresponding fitting than at the center of the socket, of arm-like supports engaged with said sockets and each having a journal-opening at its outer end; means for preventing the longitudinal movement of the arm-like supports in their sockets; a pivot block or carrier; and pivot-pins extending from the block and entering the respective journal-openings, two at least of said pins being integral with said block.

4. A universal joint comprising a pair of tubular fittings adapted to be connected to the ends of the shafts between which motion is to be transmitted and each of which fittings has a pair of diametrically opposite undercut sockets in its periphery, combined with arm-like supports engaged with such sockets; and means for pivotally connecting the arm-like supports with each other.

5. A universal joint comprising a pair of tubular fittings adapted to be connected to the ends of the shafts between which motion is to be transmitted and each of which fittings has a pair of diametrically opposite undercut sockets in its periphery, combined with arm-like supports engaged with such sockets; means for preventing the longitudinal movement of the arm-like supports in their sockets; and means for pivotally connecting the arm-like supports with each other.

6. A flexible chain made up of a connected series of universal joints each comprising a part having a pair of undercut sockets diametrically opposite each other combined with arm-like supports fixed in said sockets and each having a journal-opening at its outer end; a pivot block or carrier between each set of connected arm-like supports and pivot-pins extending from the block and entering the respective journal-openings, two at least of the pins extending from each block being integral therewith.

In testimony whereof I have hereunto signed my name in the presence of two subscribing witnesses.

REINHART W. PITTMAN.

Witnesses:
PIERSON L. WELLS,
EDWARD A. JARVIS.